United States Patent
Bae et al.

(10) Patent No.: US 11,041,025 B2
(45) Date of Patent: Jun. 22, 2021

(54) MODIFIED CONJUGATED DIENE-BASED POLYMER AND METHOD FOR PREPARING THE SAME

(71) Applicant: LG Chem, Ltd., Seoul (KR)

(72) Inventors: Hyo Jin Bae, Daejeon (KR); Su Hwa Kim, Daejeon (KR); Jeong Heon Ahn, Daejeon (KR); Suk Youn Kang, Daejeon (KR)

(73) Assignee: LG Chem, Ltd.

( * ) Notice: Subject to any disclaimer, the term of this patent is extended or adjusted under 35 U.S.C. 154(b) by 41 days.

(21) Appl. No.: 16/469,814

(22) PCT Filed: Sep. 21, 2018

(86) PCT No.: PCT/KR2018/011302
§ 371 (c)(1),
(2) Date: Jun. 14, 2019

(87) PCT Pub. No.: WO2019/083173
PCT Pub. Date: May 2, 2019

(65) Prior Publication Data
US 2020/0087419 A1 Mar. 19, 2020

(30) Foreign Application Priority Data
Oct. 25, 2017 (KR) .......................... 10-2017-0139405

(51) Int. Cl.
| | | |
|---|---|---|
| C08C 19/22 | (2006.01) | |
| C08C 19/25 | (2006.01) | |
| C08F 136/06 | (2006.01) | |
| C08F 4/54 | (2006.01) | |
| C08F 36/04 | (2006.01) | |

(52) U.S. Cl.
CPC .............. *C08C 19/25* (2013.01); *C08C 19/22* (2013.01); *C08F 4/545* (2013.01); *C08F 36/04* (2013.01); *C08F 136/06* (2013.01); *C08F 2810/00* (2013.01)

(58) Field of Classification Search
CPC ................................. C08C 19/22; C08C 19/25
See application file for complete search history.

(56) References Cited

U.S. PATENT DOCUMENTS

| | | | |
|---|---|---|---|
| 6,030,987 A | 2/2000 | Silverman et al. | |
| 2008/0182954 A1* | 7/2008 | Luo ...................... | B60C 1/0025 526/221 |
| 2009/0005497 A1 | 1/2009 | Maeda et al. | |
| 2009/0203843 A1 | 8/2009 | Fukuoka et al. | |
| 2010/0317818 A1 | 12/2010 | Hogan et al. | |
| 2011/0172344 A1 | 7/2011 | Yoshida et al. | |
| 2012/0059112 A1 | 3/2012 | Luo et al. | |
| 2013/0331480 A1 | 12/2013 | Suzuki et al. | |
| 2014/0309363 A1 | 10/2014 | Morita et al. | |
| 2017/0022301 A1 | 1/2017 | Luo et al. | |
| 2018/0312669 A1 | 11/2018 | Kang et al. | |

FOREIGN PATENT DOCUMENTS

| | | |
|---|---|---|
| CN | 101495522 A | 7/2009 |
| CN | 102177185 A | 9/2011 |
| CN | 103333275 A | 10/2013 |
| CN | 103391967 A | 11/2013 |
| CN | 103534281 A | 1/2014 |
| JP | 2004292559 A | 10/2004 |
| JP | 2008-274067 A | 11/2008 |
| JP | 2009030032 A | 2/2009 |
| JP | 2009287020 A | 12/2009 |
| JP | 2011102347 A | 5/2011 |
| JP | 2012515838 A | 7/2012 |
| JP | 2012172121 A | 9/2012 |
| JP | 2013018813 A | 1/2013 |
| JP | 5340556 B2 | 11/2013 |
| JP | 2016222927 A | 12/2016 |
| JP | 2018536053 A | 12/2018 |
| KR | 10-2011-0070871 A | 6/2011 |
| KR | 10-2014-0056163 A | 5/2014 |
| KR | 10-2016-0062950 A | 6/2016 |
| KR | 20170077517 A | 7/2017 |
| KR | 20170077614 A | 7/2017 |
| WO | 2010085622 A2 | 7/2010 |
| WO | 2018-008911 A1 | 1/2018 |

OTHER PUBLICATIONS

Search Report from International Application No. PCT/KR2018/011302.
Extended European Search Report for Application No. EP18870421 dated Mar. 4, 2020, 5 pages.
Chinese Search Report for Application No. 201880005150.8, dated Mar. 29, 2021, pp. 1-3.

* cited by examiner

Primary Examiner — Marc S Zimmer
(74) Attorney, Agent, or Firm — Lerner, David, Littenberg, Krumholz & Mentlik, LLP

(57) ABSTRACT

The present invention relates to a modified conjugated diene-based polymer having a high modification ratio with improved compounding properties by being excellent affinity with a filler and a method for preparing the same. The modified conjugated diene-based polymer thus prepared includes a functional group derived from a compound represented by Formula 1 at one terminal, and has excellent affinity with a filler. If the modified conjugated diene-based polymer is applied to a rubber composition, excellent processability, tensile strength and viscoelasticity may be achieved.

17 Claims, No Drawings

MODIFIED CONJUGATED DIENE-BASED POLYMER AND METHOD FOR PREPARING THE SAME

TECHNICAL FIELD

Cross-Reference to Related Applications

The present application is a national phase entry under 35 U.S.C. § 371 of International Application No. PCT/KR2018/011302 filed Sep. 21, 2018, which claims priority from Korean Patent Application No. 10-2017-0139405 filed Oct. 25, 2017, all of which are incorporated herein by reference.

Technical Field

The present invention relates to a modified conjugated diene-based polymer having a high modification ratio with improved compounding properties by being excellent affinity with a filler, and a method for preparing the same.

BACKGROUND ART

Recently, according to the growing attention on energy saving and environmental issues, the decrease of the fuel consumption ratio of cars is required. As a method for accomplishing the requirement, a method for decreasing the heating properties of tires using an inorganic filler such as silica and carbon black in a rubber composition for forming tires has been suggested. However, the dispersion of the inorganic filler in the rubber composition is not favorable, and defects of degrading overall physical properties of the rubber composition such as abrasion resistance, crack resistance and processability arise.

In order to solve such defects, a method of modifying the polymerization active part of a conjugated diene-based polymer which is obtained by anionic polymerization using organolithium with a functional group which is capable of interacting with an inorganic filler, has been developed as a method for increasing the dispersibility of the inorganic filler such as silica and carbon black in a rubber composition. Particularly, a method of modifying the polymerization active terminal of a conjugated diene-based polymer with a tin compound, a method of introducing an amino group, or a method of modifying with an alkoxysilane derivative has been suggested.

However, if a rubber composition is prepared using a modified conjugated diene-based polymer which is modified by the above-described methods, low heating properties may be secured, but the improving effects of the physical properties of a rubber composition, such as abrasion resistance and processability were insufficient.

As another method, in a living polymer obtained by coordination polymerization using a catalyst including a lanthanide rare earth element compound, a method of modifying a living active terminal using a specific coupling agent or a modifier has been developed. However, in the conventionally known catalyst including a lanthanide rare earth element compound, the activity of the living terminal thus obtained is weak, and the modification ratio of the terminal is low, and thus, the improving effects of the physical properties of the rubber composition is insignificant.

DISCLOSURE OF THE INVENTION

Technical Problem

The present invention has been devised to solve the above-mentioned problems of the conventional technique, and an object of the present invention is to provide a modified conjugated diene-based polymer having a high modification ratio with improved compounding properties by being excellent affinity with a filler.

In addition, another object of the present invention is to provide a method for preparing the modified conjugated diene-based polymer.

Technical Solution

To solve the above-described tasks, there is provided in the present invention a modified conjugated diene-based polymer including a functional group derived from a compound represented by the following Formula 1, wherein a modification ratio of the modified conjugated diene-based polymer is from 20 mol % to 50 mol %:

[Formula 1]

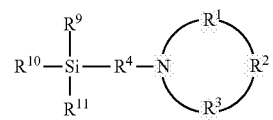

in Formula 1, $R^1$ and $R^3$ are each independently a trivalent hydrocarbon group of 1 to 10 carbon atoms, which is substituted with one or more substituents selected from the group consisting of a halogen group, an alkyl group of 1 to 20 carbon atoms, a cycloalkyl group of 3 to 20 carbon atoms and an aryl group of 6 to 30 carbon atoms; or an unsubstituted divalent hydrocarbon group of 1 to 10 carbon atoms, $R^2$ is a trivalent hydrocarbon group of 1 to 10 carbon atoms, which is substituted with —$R^6COOR^7$, $R^4$ and $R^6$ are single bonds, $R^7$ is an alkyl group of 1 to 20 carbon atoms, or a cycloalkyl group of 3 to 20 carbon atoms, and $R^9$ to $R^{11}$ are each independently hydrogen or an alkyl group of 1 to 20 carbon atoms.

In addition, there is provided in the present invention a method for preparing the modified conjugated diene-based polymer, including: polymerizing a conjugated diene-based monomer in the presence of a lanthanide rare earth element catalyst composition to prepare an active polymer including an organometal part; and reacting the active polymer with a compound represented by the following Formula 1, wherein the lanthanide rare earth element catalyst composition includes a lanthanide rare earth element-containing compound, a first alkylating agent, a second alkylating agent, a halide and a conjugated diene-based monomer in a molar ratio of 1:100 to 200:40 to 60:2 to 4:20 to 50:

[Formula 1]

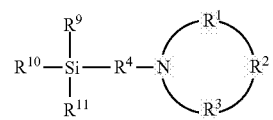

in Formula 1, $R^1$ and $R^3$ are each independently a trivalent hydrocarbon group of 1 to 10 carbon atoms, which is substituted with one or more substituents selected from the group consisting of a halogen group, an alkyl group of 1 to 20 carbon atoms, a cycloalkyl group of 3 to 20 carbon atoms and an aryl group of 6 to 30 carbon atoms; or an unsubstituted divalent hydrocarbon group of 1 to 10 carbon atoms, $R^2$ is a trivalent hydrocarbon group of 1 to 10 carbon atoms, which is substituted with —$R^6COOR^7$, $R^4$ and $R^6$ are single bonds, $R^7$ is an alkyl group of 1 to 20 carbon atoms, or a cycloalkyl group of 3 to 20 carbon atoms, and $R^9$ to $R^{11}$ are each independently hydrogen or an alkyl group of 1 to 20 carbon atoms.

Advantageous Effects

The conjugated diene-based polymer according to the present invention includes a functional group derived from a compound represented by Formula 1, particularly, a cyclized tertiary amine group which is a functional group having affinity with a filler to improve the affinity with a filler, in at least one terminal, and may have excellent affinity with a filler, and if applied to a rubber composition, excellent processability, tensile strength and viscoelasticity may be achieved.

In addition, the modified conjugated diene-based polymer according to an embodiment of the present invention is prepared in the presence of a catalyst composition according to the present invention, and a functional group derived from a compound represented by Formula 1 may be easily introduced in at least one terminal of a polymer chain, thereby achieving a high modification ratio.

BEST MODE FOR CARRYING OUT THE INVENTION

Hereinafter, the present invention will be described in more detail in order to assist the understanding of the present invention.

It will be understood that words or terms used in the description and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The term "substituted" used in the present invention may mean that the hydrogen of a functional group, an atomic group or a compound is substituted with a specific substituent. If the hydrogen of a functional group, an atomic group or a compound is substituted with a specific substituent, one or a plurality including two or more substituents may be present according to the number of hydrogen present in the functional group, the atomic group or the compound. If a plurality of substituents are present, each substituent may be the same or different.

The term "alkyl group" used in the present invention may mean monovalent aliphatic saturated hydrocarbon, and may include both a linear alkyl group such as methyl, ethyl, propyl and butyl, and a branched alkyl group such as isopropyl, sec-butyl, tert-butyl and neo-pentyl.

The term "alkylene group" used in the present invention may mean divalent aliphatic saturated hydrocarbon such as methylene, ethylene, propylene and butylene.

The term "cycloalkyl group" used in the present invention may mean cyclic saturated hydrocarbon, or cyclic unsaturated hydrocarbon including one or two or more unsaturated bonds.

The term "aryl group" used in the present invention may mean cyclic aromatic hydrocarbon, and may include both monocyclic aromatic hydrocarbon including one ring, and polycyclic aromatic hydrocarbon including two or more combined rings.

The term "derived unit" and "derived functional group" used in the present invention may represent a component or a structure comes from a certain material, or the material itself.

The term "monovalent hydrocarbon group" used in the present invention means a monovalent substituent derived from a hydrocarbon group and may mean a monovalent atomic group in which carbon and hydrogen are bonded, such as an alkyl group, an alkenyl group, an alkynyl group, a cycloalkyl group and an aryl group containing one or more unsaturated bonds. The monovalent atomic group may have a linear or branched structure according to the bonding structure thereof.

The term "divalent hydrocarbon group" used in the present invention means a divalent substituent derived from a hydrocarbon group and may mean a divalent atomic group in which carbon and hydrogen are bonded, such as an alkylene group, an alkenylene group, an alkynylene group, a cycloalkylene group, an cycloalkylene group containing one or more unsaturated bonds, and an arylene group. The divalent atomic group may have a linear or branched structure according to the bonding structure thereof.

The present invention provides a modified conjugated diene-based polymer having a high modification ratio with improved compounding properties by excellent affinity with a filler.

The modified conjugated diene-based polymer according to an embodiment of the present invention is characterized in including a functional group derived from a compound represented by the following Formula 1, and having the modification ratio of 20 mol % to 50 mol %:

[Formula 1]

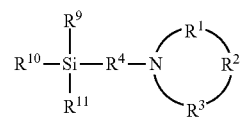

in Formula 1, $R^1$ and $R^3$ are each independently a trivalent hydrocarbon group of 1 to 10 carbon atoms, which is substituted with one or more substituents selected from the group consisting of a halogen group, an alkyl group of 1 to 20 carbon atoms, a cycloalkyl group of 3 to 20 carbon atoms and an aryl group of 6 to 30 carbon atoms; or an unsubstituted divalent hydrocarbon group of 1 to 10 carbon atoms, $R^2$ is a trivalent hydrocarbon group of 1 to 10 carbon atoms, which is substituted with —$R^6COOR^7$, $R^4$ and $R^6$ are single bonds, $R^7$ is an alkyl group of 1 to 20 carbon atoms, or a cycloalkyl group of 3 to 20 carbon atoms, and $R^9$ to $R^{11}$ are each independently hydrogen or an alkyl group of 1 to 20 carbon atoms.

Particularly, in Formula 1, $R^1$ and $R^3$ may be each independently a trivalent hydrocarbon group of 1 to 10 carbon atoms, which is substituted with a substituent, or a divalent hydrocarbon group of 1 to 10 carbon atoms, which is unsubstituted. If $R^1$ and $R^3$ are each independently the divalent hydrocarbon group of 1 to 10 carbon atoms, which is unsubstituted, $R^1$ and $R^3$ may be each independently, an alkylene group of 1 to 10 carbon atoms such as a methylene group, an ethylene group and a propylene group; or an arylene group of 6 to 10 carbon atoms such as a phenylene group. In addition, if $R^1$ and $R^3$ are each independently a trivalent hydrocarbon group of 1 to 10 carbon atoms, which is substituted with a substituent, $R^1$ and $R^3$ may be each independently a substituted one of which one or more hydrogen atoms bonded to carbon atoms in a hydrocarbon group are substituted with substituents, where the substituent may be one or more selected from the group consisting of a halogen group, an alkyl group of 1 to 20 carbon atoms, a cycloalkyl group of 3 to 20 carbon atoms and an aryl group of 6 to 30 carbon atoms, particularly, one or more selected from the group consisting of an alkyl group of 1 to 10 carbon atoms, a cycloalkyl group of 6 to 12 carbon atoms and an aryl group of 6 to 12 carbon atoms.

Meanwhile, the "trivalent hydrocarbon group substituted with a substituent" means a total trivalence substituted hydrocarbon group from a bond in a ring including an N atom (divalence) and a bond with the above-defined substituent (monovalence).

In Formula 1, $R^2$ may be a trivalent hydrocarbon group of 1 to 10 carbon atoms, which is substituted with —$R^6COOR^2$, where $R^6$ is a single bond and $R^2$ is an alkyl group of 1 to 20 carbon atoms or a cycloalkyl group of 3 to 20 carbon atoms.

Here, the "single bond" means a single covalent bond itself, not including an additional atom or molecule group.

In an embodiment of the present invention, in Formula 1, $R^1$ and $R^3$ may be each independently an alkylene group of 1 to 10 carbon atoms, $R^2$ may be a trivalent hydrocarbon group of 1 to 3 carbon atoms, which is substituted with —$R^6COOR^2$, $R^4$ and $R^6$ may be single bonds, $R^2$ may be an alkyl group of 1 to 20 carbon atoms, and $R^9$ to $R^{11}$ may be each independently an alkyl group of 1 to 20 carbon atoms, particularly, $R^1$ and $R^3$ may be each independently an alkylene group of 1 to 3 carbon atoms, $R^2$ may be a trivalent hydrocarbon group of 1 carbon atom, which is substituted with —$R^6COOR^2$, $R^4$ and $R^6$ may be single bonds, $R^2$ may be an alkyl group of 1 to 6 carbon atoms, and $R^9$ to $R^{11}$ may be each independently an alkyl group of 1 to 10 carbon atoms.

More particularly, in an embodiment of the present invention, the compound represented by Formula 1 may be one selected from the group consisting of the compounds represented by the following Formulae 1-1 to 1-3:

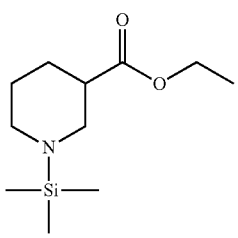

[Formula 1-1]

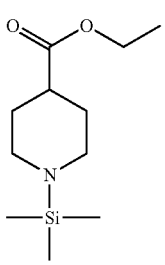

[Formula 1-2]

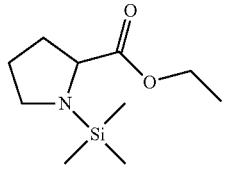

[Formula 1-3]

The modified conjugated diene-based polymer according to an embodiment of the present invention includes a functional group derived from a compound represented by Formula 1, particularly, a cyclized tertiary amine group which is a functional group having affinity with a filler and may improve the affinity with a filler, in at least one terminal, and the agglomeration between filler particles may be prevented and the dispersibility of the filler may be improved. In an embodiment, if silica which is a kind of an inorganic filler is used as the filler, agglomeration may be easily occur due to the hydrogen bonds between hydroxyl groups present at the surface of the silica. The cyclized tertiary amine group may inhibit the hydrogen bond between the hydroxyl groups of the silica to improve the dispersibility of the silica. Thus, the processability of a rubber composition including the modified conjugated diene-based polymer according to the present invention may be improved, and as a result, the tensile strength, abrasion resistance and viscoelasticity properties of a molded article, for example, a tire manufactured using the rubber composition may be improved.

In addition, since the modified conjugated diene-based polymer according to an embodiment of the present invention is prepared by a preparation method using a catalyst composition which will be explained later, the functional group derived from the compound represented by Formula 1 may be easily introduced in at least one terminal of a polymer chain, and a high modification ratio may be achieved. Accordingly, the modified conjugated diene-based polymer according to the present invention may have largely increased affinity with a filler when compared with a polymer having a low modification ratio. As a result, a molded article, for example, a tire manufactured using the modified conjugated diene-based polymer of the present invention may have improved tensile strength, abrasion resistance and viscoelasticity properties.

Particularly, the modified conjugated diene-based polymer according to an embodiment of the present invention may have a modification ratio of 20 mol % to 50 mol %, more particularly, 30 mol % to 40 mol %.

Here, the "modification ratio" represents the ratio of the functional group derived from the compound represented by Formula 1 in the modified conjugated diene-based polymer, and represents the mol % of the remainder excluding the derived unit of a conjugated diene-based monomer, i.e., the functional group derived from the compound represented by Formula 1, based on 100 mol % of the modified conjugated diene-based polymer.

Meanwhile, in an embodiment of the present invention, the modification ratio was calculated using a chromatogram obtained by measuring chromatography.

Particularly, a chromatogram was obtained by dissolving each polymer in tetrahydrofuran (THF) under 40° C. conditions to prepare a specimen, injecting each specimen into gel permeation chromatography (GPC), and flowing tetrahydrofuran as an eluent. From the chromatogram thus obtained, a modification ratio was calculated from the following Mathematical Formula 1:

[Mathematical Formula 1]

$$\text{modification ratio (\%)} = \frac{\text{peak area of modified polymer}}{\text{peak area of unmodified polymer} + \text{peak are of modified polymer}} \times 100$$

The conjugated diene-based polymer may be a butadiene homopolymer such as polybutadiene, or a butadiene copolymer such as a butadiene-isoprene copolymer.

In a particular embodiment, the conjugated diene-based polymer may include 80 to 100 wt % of a repeating unit derived from a 1,3-butadiene monomer, and selectively 20 wt % or less of a repeating unit derived from other conjugated diene-based monomer which is copolymerizable with 1,3-butadiene. Within the above-mentioned ranges, effect of not decreasing the 1,4-cis bond content in a polymer may be achieved. In this case, the 1,3-butadiene monomer may include 1,3-butadiene or the derivatives thereof, such as 1,3-butadiene, 2,3-dimethyl-1,3-butadiene, and 2-ethyl-1,3-butadiene. The other conjugated diene-based monomer which is copolymerizable with 1,3-butadiene may include 2-methyl-1,3-pentadiene, 1,3-pentadiene, 3-methyl-1,3-pentadiene, 4-methyl-1,3-pentadiene, 1,3-hexadiene or 2,4-hexadiene, and any one among the compounds or a compound of two or more thereof may be used.

According to an embodiment of the present invention, the conjugated diene-based polymer may be a conjugated diene-based polymer including an organometal part which is derived from a catalyst composition including a lanthanide rare earth element-containing compound, i.e., activated from a catalyst, and may particularly be a neodymium catalyzed butadiene-based polymer including a repeating unit derived from a 1,3-butadiene monomer.

In the present invention, the activated organometal part of the conjugated diene-based polymer may be an activated organometal part at the terminal of the conjugated diene-based polymer (activated organometal part at the terminal of a molecular chain), an activated organometal part in a main chain, or an activated organometal part in a side chain. Among them, in case where an activated organometal part of a conjugated diene-based polymer is obtained by anionic polymerization or coordination anionic polymerization, the activated organometal part may be an activated organometal part at the terminal.

In addition, the modified conjugated diene-based polymer according to an embodiment of the present invention may be prepared in the presence of a catalyst composition which will be explained below, and may have optimized molecular weight distribution and mooney viscosity properties to improve the balance of physical properties including the viscoelasticity, tensile properties and processability of a rubber composition, and may have high linearity.

In addition, the modified conjugated diene-based polymer may have narrow molecular weight distribution (Mw/Mn) of 2.0 to 3.0, and if applied to a rubber composition within this range, tensile properties and viscoelasticity may be excellent. The molecular weight distribution may be, for example, 2.0 to 2.8, or 2.0 to 2.5.

In the present invention, the molecular weight distribution of the modified conjugated diene-based polymer may be calculated from a ratio (Mw/Mn) of a weight average molecular weight (Mw) to a number average molecular weight (Mn). In this case, the number average molecular weight (Mn) is a common average of an individual polymer molecular weight, which is obtained by measuring the molecular weights of n polymer molecules, obtaining the total of the molecular weights and dividing the total by n. The weight average molecular weight (Mw) shows the molecular weight distribution of a polymer composition. All molecular weight average values may be expressed by gram per mol (g/mol). In addition, each of the weight average molecular weight and the number average molecular weight may mean a polystyrene converted molecular weight analyzed by gel permeation chromatography (GPC).

The modified and conjugated diene-based polymer according to an embodiment of the present invention may satisfy the above-described molecular weight distribution conditions, and at the same time, may have a weight average molecular weight (Mw) of $4 \times 10^5$ to $1.0 \times 10^6$ g/mol, and a number average molecular weight (Mn) of $2.0 \times 10^5$ to $5.0 \times 10^5$ g/mol. If applied to a rubber composition within the ranges, tensile properties may be excellent and processability may be good, and workability of the rubber composition may be improved and mulling and kneading may become easy, thereby achieving excellent mechanical properties and excellent balance of the physical properties of the rubber composition. The weight average molecular weight may be, for example, from $4.5 \times 10^5$ to $1.0 \times 10^6$ g/mol, or from $5 \times 10^5$ to $1.0 \times 10^6$ g/mol, and the number average molecular weight may be, for example, from $2.0 \times 10^5$ to $4.5 \times 10^5$ g/mol, or from $2.0 \times 10^5$ to $4.0 \times 10^5$ g/mol.

More particularly, if the modified conjugated diene-based polymer according to an embodiment of the present invention satisfies the conditions of the molecular weight distribution together with the weight average molecular weight and the number average molecular weight at the same time, and if applied to a rubber composition, tensile properties, viscoelasticity and processability of the rubber composition may be excellent and balance among physical properties may be excellent.

In addition, the modified conjugated diene-based polymer according to an embodiment of the present invention may have a mooney viscosity (MV) at 100° C. of 30 to 70, and within this range, even better processability may be shown. The mooney viscosity at 100° C. may be, for example, 40 to 70.

In the present invention, the mooney viscosity may be measured by using a mooney viscometer, for example, MV2000E of Monsanto Co., Ltd. using Large Rotor at a rotor speed of 2±0.02 rpm at 100° C. In this case, a specimen used may be stood at room temperature (23±3° C.) for 30 minutes or more, and 27±3 g of the specimen may be collected and put in a die cavity, and then, Platen may be operated for measurement.

In addition, the present invention provides a method for preparing the modified conjugated diene-based polymer.

The method for preparing the modified conjugated diene-based polymer according to an embodiment of the present invention includes polymerizing a conjugated diene-based monomer in the presence of a lanthanide rare earth element catalyst composition to prepare an active polymer including an organometal part (step 1); and reacting the active polymer with a compound represented by the following Formula 1 (step 2), wherein the lanthanide rare earth element catalyst composition includes a lanthanide rare earth element-containing compound, a first alkylating agent, a second alkylating agent, a halide and a conjugated diene-based monomer in a molar ratio of 1:100 to 200:40 to 60:2 to 4:20 to 50:

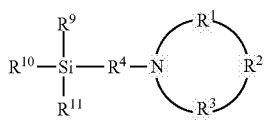
[Formula 1]

in Formula 1, $R^1$ and $R^3$ are each independently a trivalent hydrocarbon group of 1 to 10 carbon atoms, which is substituted with one or more substituents selected from the group consisting of a halogen group, an alkyl group of 1 to 20 carbon atoms, a cycloalkyl group of 3 to 20 carbon atoms and an aryl group of 6 to 30 carbon atoms; or an unsubstituted divalent hydrocarbon group of 1 to 10 carbon atoms, $R^2$ is a trivalent hydrocarbon group of 1 to 10 carbon atoms, which is substituted with —$R^6COOR^7$, $R^4$ and $R^6$ are single bonds, $R^7$ is an alkyl group of 1 to 20 carbon atoms, or a cycloalkyl group of 3 to 20 carbon atoms, and $R^9$ to $R^{11}$ are each independently hydrogen or an alkyl group of 1 to 20 carbon atoms.

In the method for preparing the modified conjugated diene-based polymer according to an embodiment of the present invention, a conjugated diene-based monomer is polymerized using the catalyst composition, and an active polymer which is useful for modification reaction may be prepared, and thus, a modified conjugated diene-based polymer having a high modification ratio may be prepared.

Particularly, the method for preparing the modified conjugated diene-based polymer will be explained step by step.

Step 1 is a step for preparing an active polymer including an organometal part by polymerizing a conjugated diene-based monomer, and may be performed by polymerizing the conjugated diene-based monomer in the presence of a lanthanide rare earth element catalyst composition.

Here, the lanthanide rare earth element catalyst composition may include a lanthanide rare earth element-containing compound, a first alkylating agent, a second alkylating agent, a halide and a conjugated diene-based monomer, and in this case, the lanthanide rare earth element-containing compound, the first alkylating agent, the second alkylating agent, the halide and the conjugated diene-based monomer may have a molar ratio of 1:100 to 200:40 to 60:2 to 4:20 to 50. Particularly, the lanthanide rare earth element-containing compound, the first alkylating agent, the second alkylating agent, the halide and the conjugated diene-based monomer may have a molar ratio of 1:100 to 150:40 to 50:2 to 3:20 to 30.

In addition, the lanthanide rare earth element catalyst composition may be prepared by mixing a lanthanide rare earth element-containing compound, an aluminoxane, an organoaluminum compound, a halide and a conjugated diene-based monomer in a hydrocarbon-based solvent at a temperature of −30° C. to −20° C., and standing at a temperature of −30° C. to −20° C. for 24 hours to 36 hours.

Particularly, the lanthanide rare earth element catalyst composition may be prepared by injecting a lanthanide rare earth element-containing compound, a first alkylating agent, a second alkylating agent, a halide and selectively, a conjugated diene-based monomer one by one into a hydrocarbon-based solvent, and mixing. In this case, the hydrocarbon-based solvent may be a non-polar solvent having no reactivity with the constituent components of the catalyst composition. Particularly, the hydrocarbon-based solvent may be one or more selected from the group consisting of an aliphatic hydrocarbon-based solvent such as pentane, hexane, isopentane, heptane, octane, and isooctane; a cycloaliphatic hydrocarbon-based solvent such as cyclopentane, methylcyclopentane, cyclohexane, methylcyclohexane, and ethylcyclohexane; or an aromatic hydrocarbon-based solvent such as benzene, toluene, ethylbenzene and xylene. Particularly, the hydrocarbon-based solvent may be an aliphatic hydrocarbon-based solvent such as hexane.

The lanthanide rare earth element catalyst composition according to an embodiment of the present invention has the above-described composition and is prepared as described above, and the activity of subsequent modification reaction of the active polymer may be increased, and as a result, the modification ratio of the modified conjugated diene-based polymer may be increased.

In addition, by premixing a portion of the conjugated diene-based monomer used for the polymerization reaction with the catalyst composition and by using a catalyst composition type for preforming, catalyst activity may be improved, and further, the conjugated diene-based polymer thus prepared may be stabilized.

In the present invention, the "preforming" may mean the following. If a catalyst composition, i.e., a catalyst system includes diisobutylaluminum hydride (DIBAH), etc., and if a small amount of a conjugated diene-based monomer such as butadiene is added to decrease the production possibility of diverse catalyst active species with the DIBAH, and pre-polymerization may be performed in the catalyst system with the addition of butadiene. In addition, "premix" may mean a homogeneously mixed state of each compound without forming a polymer in a catalyst system.

Particularly, as the conjugated diene-based monomer, one or more selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene, may be used. Partial amount of the conjugated diene-based monomer used for the preparation of the catalyst composition, may be used within the total amount range of the conjugated diene-based monomer used for the polymerization reaction.

The lanthanide rare earth element-containing compound may be a compound including one or two or more rare earth metals of atomic numbers of 57 to 71 in the periodic table, such as neodymium, praseodymium, cerium, lanthanum and gadolinium, particularly, a compound including neodymium.

In another embodiment, the lanthanide rare earth element-containing compound may be a salt which is soluble in a hydrocarbon solvent, such as the carboxylate, alkoxide, 13-diketone complex, phosphate and phosphate of the lanthanide rare earth element, particularly, a neodymium-containing carboxylate.

The hydrocarbon solvent may be, for example, a saturated aliphatic hydrocarbon of 4 to 10 carbon atoms such as butane, pentane, hexane, and heptanes; a saturated alicyclic hydrocarbon such as cyclopentane and cyclohexane; mono olefins such as 1-butene and 2-butene; an aromatic hydrocarbon such as benzene, toluene and xylene; or a halogenated hydrocarbon such as methylene chloride, chloroform, trichloroethylene, perchloroethylene, 1,2-dichloroethane, chlorobenzene, bromobenzene and chlorotoluene.

According to an embodiment of the present invention, the lanthanide rare earth element-containing compound may include a neodymium compound represented by the following Formula 3:

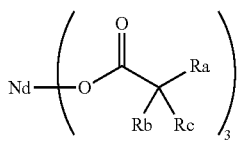

[Formula 3]

In Formula 3, $R_a$ to $R_c$ may be each independently hydrogen or an alkyl group of 1 to 12 carbon atoms, where all $R_a$ to $R_c$ are not hydrogen at the same time.

In a particular embodiment, the neodymium compound may be one or more selected from the group consisting of Nd(neodecanoate)$_3$, Nd(2-ethylhexanoate)$_3$, Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl-2-isopropyl decanoate)$_3$, Nd(2-butyl-2-hexyl decanoate)$_3$, Nd(2-hexyl-2-octyl decanoate)$_3$, Nd(2-t-butyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2-ethyl-2-hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexyl nonanoate)$_3$, Nd(2-ethyl-2-propyl nonanoate)$_3$ and Nd(2-ethyl-2-hexyl nonanoate)$_3$.

In another embodiment, considering excellent solubility in a polymerization solvent without fear of oligomerization and conversion ratio to catalyst active species, and consequential excellent improving effect of catalyst activity, the lanthanide rare earth element-containing compound may be a neodymium compound, more particularly, Formula 3 where $R_a$ is a linear or branched alkyl group of 4 to 12 carbon atoms, and $R_b$ and $R_c$ are each independently hydrogen or an alkyl group of 2 to 8 carbon atoms, where $R_b$ and $R_c$ are not hydrogen at the same time.

In a more particular embodiment, in Formula 3, $R_a$ may be a linear or branched alkyl group of 6 to 8 carbon atoms, and $R_b$ and $R_c$ may be each independently hydrogen or an alkyl group of 2 to 6 carbon atoms, where $R_b$ and $R_c$ may not be hydrogen at the same time, and the particular examples thereof may include one or more selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl-2-isopropyl decanoate)$_3$, Nd(2-butyl-2-hexyl decanoate)$_3$, Nd(2-hexyl-2-octyl decanoate)$_3$, Nd(2-t-butyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2-ethyl-2-hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexyl nonanoate)$_3$, Nd(2-ethyl-2-propyl nonanoate)$_3$ and Nd(2-ethyl-2-hexyl nonanoate)$_3$, and among them, the neodymium compound may be one or more selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, and Nd(2,2-dioctyl decanoate)$_3$.

More particularly, in Formula 3, $R_a$ may be a linear or branched alkyl group of 6 to 8 carbon atoms, and $R_b$ and $R_c$ may be each independently an alkyl group of 2 to 6 carbon atoms.

As described above, the neodymium compound represented by Formula 3 includes a carboxylate ligand containing an alkyl group of two or more carbon atoms, having various lengths as a substituent at an a position, and steric change may be induced around a neodymium central metal to block the tangling among compounds, and as a result, the restraining effect of oligomerization may be achieved. Also, such a neodymium compound has high solubility in a polymerization solvent, and the ratio of neodymium positioned at the central part, which has difficulty in conversion into a catalyst active species, is decreased, and thus, a conversion ratio into the catalyst active species is high.

In another embodiment, the weight average molecular weight (Mw) of the neodymium compound represented by Formula may be 600 to 2000 g/mol. With the weight average molecular weight range, excellent catalyst activity may be shown stably.

In addition, the lanthanide rare earth element-containing compound may have a solubility of about 4 g or more per 6 g of a non-polar solvent at room temperature (25° C.). In the present invention, the solubility of the lanthanide rare earth element-containing compound means the degree of clear dissolution without generating turbid phenomenon. Through showing such high solubility, excellent catalyst activity may be attained.

The lanthanide rare earth element-containing compound may be used, for example, in an amount of 0.1 to 0.5 mmol, more particularly, 0.1 to 0.2 mmol per 100 g of the conjugated diene-based monomer used for polymerization. Within the range, catalyst activity is high and appropriate catalyst concentration is achieved, and thus, a separate demineralization process is not required.

The lanthanide rare earth element-containing compound may be used as a reaction product type with, for example, a Lewis base. Due to the Lewis base, the reaction product may attain improved solubility of the lanthanide rare earth element-containing compound in a solvent and may attain the effect of stable storage for a long time. In an embodiment, the Lewis base may be used in a ratio of 30 mol or less, or 1 to 10 mol per 1 mol of a rare earth element. The Lewis base may be, for example, acetyl acetone, tetrahydrofuran, pyridine, N,N-dimethylformamide, thiophene, diphenyl ether, triethylamine, organophosphorous compounds or monohydric or dihydric alcohols.

The first alkylating agent may be an aluminoxane, and the aluminoxane may be prepared by reacting a trihydrocarbyl aluminum-based compound with water. Particularly, the aluminoxane may be a linear aluminoxane of the following Formula 4a or a circular aluminoxane of the following Formula 4b:

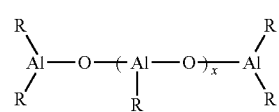

[Fomula 4a]

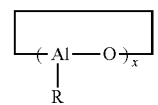

[Formula 4b]

In Formulae 4a and 4b, R is a monovalent organic group which is combined with an aluminum atom via a carbon atom, and may be a hydrocarbyl group, and x and y may be each independently an integer of 1 or more, particularly, an integer of 1 to 100, and more particularly, an integer of 2 to 50.

More particularly, the aluminoxane may be methylaluminoxane (MAO), modified methylaluminoxane (MAO), ethylaluminoxane, n-propylaluminoxane, isopropylaluminoxane, n-butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane or 2,6-dimethylphenyl aluminoxane, and any one or a mixture of two or more thereof may be used.

In addition, the modified methylaluminoxane is obtained by substituting the methyl group of the methylaluminoxane with a modifier (R), particularly, with a hydrocarbon group of 2 to 20 carbon atoms, and particularly, may be a compound of the following Formula 5:

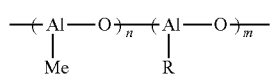

[Formula 5]

In Formula 5, R is the same as defined above, and m and n may be each independently an integer of 2 or more. In addition, in Formula 5, Me represents a methyl group.

Particularly, R in Formula 5 may be an alkyl group of 2 to 20 carbon atoms, a cycloalkyl group of 3 to 20 carbon atoms, an alkenyl group of 2 to 20 carbon atoms, a cycloalkenyl group of 3 to 20 carbon atoms, an aryl group of 6 to 20 carbon atoms, an arylalkyl group of 7 to 20 carbon atoms, an alkylaryl group of 7 to 20 carbon atoms, an allyl group, or an alkynyl group of 2 to 20 carbon atoms, and more particularly, may be an alkyl group of 2 to 10 carbon atoms such as an ethyl group, an isobutyl group, a hexyl group or an octyl group, and even more particularly, may be an isobutyl group.

More particularly, the modified methylaluminoxane may be obtained by substituting about 50 mol % to 90 mol % of the methyl group of the methylaluminoxane with the hydrocarbon group. If the amount of the substituted hydrocarbon group in the modified methylaluminoxane is in the range, alkylation may be promoted, and catalyst activity may be improved.

Such modified methylaluminoxane may be prepared by a common method, and particularly, may be prepared using trimethylaluminum and an alkylaluminum other than trimethylaluminum. In this case, the alkylaluminum may be triisobutylaluminum, triethylaluminum, trihexylaluminum, or trioctylaluminum, and any one or a mixture of two or more thereof may be used.

The second alkylating agent may be hydrocarbylaluminum dihydride, and particularly, the second alkylating agent may be one or more selected from the group consisting of dihydrocarbylaluminum hydride such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride and benzyl-n-octylaluminum hydride; ethylaluminum dihydride, n-propylaluminum dihydride, isopropylaluminum dihydride, n-butylaluminum dihydride, isobutylaluminum dihydride, and n-octylaluminum dihydride.

Meanwhile, the alkylating agent in the catalyst composition according to an embodiment of the present invention may be an organometal compound which is capable of delivering a hydrocarbyl group to another metal, and may play the role of a co-catalyst.

In addition, the catalyst composition according to an embodiment of the present invention may further include a common alkylating agent used as an alkylating agent during preparing a common conjugated diene-based polymer in addition to the first and second alkylating agents, as necessary. Such alkylating agent may be an alkylaluminum such as trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, and trioctylaluminum; an alkylmagnesium compound such as diethylmagnesium, di-n-propylmagnesium, diisopropylmagnesium, dibutylmagnesium, dihexylmagnesium, diphenylmagnesium and dibenzylmagnesium, etc., and an organolithium compound may include an alkyl lithium compound such as n-butyllithium.

Examples of the halide are not specifically limited, but the halide may be a diatomic halogen, an interhalogen compound, a hydrogen halide, an organic halide, a nonmetal halide, a metal halide, or an organometal halide, and any one of them or a mixture of two or more thereof may be used. Among them, considering the improvement of catalyst activity and consequent improving effect of reactivity, the halide may be one selected from the group consisting of an organic halide, a metal halide and an organometal halide, or a mixture of two or more thereof.

The diatomic halogen may include fluorine, chlorine, bromine, or iodine.

Also, the interhalogen compound may include iodine monochloride, iodine monobromide, iodine trichloride, iodine pentafluoride, iodine monofluoride, iodine trifluoride, etc.

Also, the hydrogen halide may include hydrogen fluoride, hydrogen chloride, hydrogen bromide, or hydrogen iodide.

In addition, the organic halide may include t-butyl chloride (t-BuCl), t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane (TMSCl), benzoyl chloride, benzoyl bromide, propionyl chloride, propionyl bromide, methyl chloroformate, methyl bromoformate, iodomethane, diiodomethane, triiodomethane (also referred to as "iodoform"), tetraiodomethane, 1-iodopropane, 2-iodopropane, 1,3-diiodopropane, t-butyl iodide, 2,2-dimethyl-1-iodopropane (also referred to as "neopentyl iodide"), allyl iodide, iodobenzene, benzyl iodide, diphenylmethyl iodide, triphenylmethyl iodide, benzylidene iodide (also referred to as "benzal iodide"), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, methyl iodoformate, or the like.

In addition, the nonmetal halide may include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride ($SiCl_4$), silicon tetrabromide, arsenic trichloride, arsenic tribromide, selenium tetrachloride, selenium tetrabromide, tellurium tetrachloride, tellurium tetrabromide, silicon tetraiodide, arsenic triiodide, tellurium tetraiodide, boron triiodide, phosphor triiodide, phosphor oxyiodide, selenium tetraiodide, or the like.

Also, the metal halide may include tin tetrachloride, tin tetrabromide, aluminum trichloride, aluminum tribromide, antimony trichloride, antimony pentachloride, antimony tribromide, aluminum trifluoride, gallium trichloride, gallium tribromide, gallium trifluoride, indium trichloride, indium tribromide, indium trifluoride, titanium tetrachloride, titanium tetrabromide, zinc dichloride, zinc dibromide, zinc difluoride, aluminum triiodide, gallium triiodide, indium triiodide, titanium tetraiodide, zinc diiodide, germanium tetraiodide, tin tetraiodide, tin diiodide, antimony triiodide or magnesium diiodide.

Also, the organometal halide may include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride (EASC), isobutylaluminum sesquichloride, methylmagnesium chloride, methylmagnesium bromide, ethylmagnesium chloride, ethylmagnesium bromide, n-butylmagnesium chloride, n-butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-n-butyltin dichloride, di-n-butyltin dibromide, tri-n-butyltin chloride, tri-n-butyltin bromide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, di-t-butyltin diiodide, or the like.

In addition, the catalyst composition according to an embodiment of the present invention may include a non-coordinating anion-containing compound or a non-coordinating anion precursor compound instead of the halide or together with the halide.

Particularly, in the compound containing the non-coordinating anion, the non-coordinating anion may be an anion not forming a coordination bond with the active center of a catalyst system due to steric hindrance and having a sterically large volume, and may be a tetraarylborate anion or a tetraarylborate fluoride anion. In addition, the compound containing the non-coordinating anion may include together with the non-coordinating anion, a carbonium cation such as a triaryl carbonium cation; an ammonium cation such as N,N-dialkyl anilinium cation, or a counter cation such as a phosphonium cation. More particularly, the compound containing the non-coordinating anion may be triphenylcarbonium tetrakis(pentafluorophenyl)borate, N,N-dimethylanilinium tetrakis(pentafluorophenyl)borate, triphenylcarbonium tetrakis[3,5-bis(trifluoromethyl) phenyl]borate, N,N-dimethylanilinium tetrakis[3,5-bis(trifluoromethyl)phenyl]borate, or the like.

In addition, as the non-coordinating anion precursor, a triaryl boron compound ($BE_3$, where E is a strongly electron withdrawing aryl group such as a pentafluorophenyl group and a 3,5-bis(trifluoromethyl) phenyl group) may be used as a compound capable of forming a non-coordinating anion under reaction conditions.

In addition, in order to perform the reaction of the active polymer with a modifier compound in the preparation of the modified conjugated diene-based polymer, the active polymer may preferably have living property or pseudo living property. The polymerization reaction of the polymer having such living property may use coordination anionic polymerization.

Accordingly, the polymerization in step 1 may be performed by radical polymerization, particularly, bulk polymerization, solution polymerization, suspension polymerization or emulsion polymerization, more particularly, solution polymerization. In another embodiment, the polymerization reaction may be performed by any one among a batch type and a continuous type. In a particular embodiment, the polymerization reaction for preparing the conjugated diene-based polymer may be performed by injecting a conjugated diene-based monomer into the catalyst composition in an organic solvent, and reacting.

In another embodiment, the polymerization may be performed in a hydrocarbon-based solvent. The hydrocarbon-based solvent may be additionally added to the amount of the hydrocarbon-based solvent used for the preparation of the catalyst composition. In this case, the hydrocarbon-based solvent may be the same as explained above. In addition, the concentration of the monomer during using the hydrocarbon-based solvent may be 3 to 80 wt %, or 10 to 30 wt %.

According to an embodiment of the present invention, during the polymerization reaction for preparing the active polymer, a reaction quenching agent for finishing the polymerization reaction such as polyoxyethylene glycol phosphate; or an antioxidant such as 2,6-di-t-butylparacresol may be further added. Besides, additives for favorable solution polymerization, particularly, additives such as a chelating agent, a dispersant, a pH controller, a deoxidizing agent and an oxygen scavenger may be selectively further used.

In another embodiment, the polymerization reaction for preparing the active polymer may be performed at a temperature of 20 to 200° C., or 20 to 100° C. for 15 minutes to 3 hours, or 30 minutes to 2 hours, and within these ranges, the control of the reaction is easy, the rate and efficiency of the polymerization reaction are excellent, and the cis-1,4 bond content of the active polymer thus prepared is high. In addition, in order to prevent the deactivation of the catalyst composition and the polymer including the lanthanide rare earth element compound, the inclusion of a compound having deactivation function such as oxygen, water and carbonic acid gas in a polymerization reaction system may preferably be prevented during performing the polymerization reaction.

As a result of such polymerization reaction, an active polymer including an organometal part activated from a catalyst including the lanthanide rare earth element-containing compound, more particularly, a neodymium catalyzed conjugated diene-based polymer including a 1,3-butadiene monomer unit is prepared, and the conjugated diene-based polymer thus prepared may have pseudo living property.

Step 2 is a step for preparing a modified conjugated diene-based polymer, and may be performed by adding a compound represented by Formula 1 or a compound represented by Formula 2 to the active polymer in amounts greater than a stoichiometric quantity with respect to an organometal part of the active polymer to carry out the reaction with an activated organometal part which is combined with the polymer.

Here, particular materials of the compound represented by Formula 1 are the same as defined above.

In this case, the compound represented by Formula 1 may be used in an amount of 0.5 to 20 mol, or 0.1 to 10 mol with respect to 1 mol of the lanthanide rare earth element-containing compound used for preparing the active polymer.

The reaction in step 2 may be modification reaction, and the modification reaction may be performed by, for example, solution reaction or solid reaction, particularly, solution reaction. In another embodiment, the modification reaction may be performed using a batch type reactor, or by a continuous type using an apparatus such as a multistage continuous reactors and an inline mixer.

In another embodiment, the modification reaction may be performed under the same temperature and pressure conditions as a common polymerization reaction, particularly, at a temperature of 20 to 100° C. Within this range, the viscosity of the polymer may not increase, and the activated terminal of the polymer may not be deactivated.

After finishing the modification reaction, the polymerization reaction may be quenched by adding an isopropanol solution of 2,6-di-t-butyl-p-cresol (BHT) to a polymerization reaction system. Then, through desolvation treatment such as steam stripping lowering the partial pressure of a solvent through the supply of vapor or vacuum drying treatment, a modified conjugated diene-based polymer may be obtained. In addition, in the reaction product obtained as the result of the modification reaction, unmodified active polymer may be included together with the modified conjugated diene polymer.

The preparation method of the modified conjugated diene-based polymer according to an embodiment of the present invention may further include precipitating and separating processes with respect to the modified conjugated diene-based polymer thus prepared. The filtering, separating and drying processes with respect to the precipitated modified conjugated diene-based polymer may be performed according to common methods.

As described above, according to the preparation method of the modified conjugated diene-based polymer according to an embodiment of the present invention, a modified conjugated diene-based polymer, particularly, a neodymium catalyzed butadiene-based polymer having narrow molecular weight distribution and excellent physical properties may be prepared.

Further, the present invention provides a rubber composition including the conjugated diene-based polymer, and a molded article manufactured from the rubber composition.

The rubber composition according to an embodiment of the present invention may include the conjugated diene-based polymer in an amount of 0.1 wt % to 100 wt %, particularly, 10 wt % to 100 wt %, more particularly, 20 wt % to 90 wt %. If the amount of the conjugated diene-based polymer is less than 0.1 wt %, the improving effects of the abrasion resistance and crack resistance of a molded article manufactured using the rubber composition, for example, a tire may be insignificant.

In addition, the rubber composition may further include other rubber components in addition to the modified conjugated diene-based polymer as necessary, and in this case, the rubber components may be included in an amount of 90 wt % or less with respect to the total weight of the rubber composition. Particularly, the rubber components may be included in an amount of 1 part by weight to 900 parts by weight with respect to 100 parts by weight of the modified conjugated diene-based polymer.

The rubber component may be a natural rubber or a synthetic rubber, for example, a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, a butyl rubber, and a halogenated butyl rubber, and any one or a mixture of two or more thereof may be used.

In addition, the rubber composition may include 0.1 parts by weight to 150 parts by weight of a filler with respect to 100 parts by weight of the conjugated diene-based polymer, and the filler may be silica-based, carbon black or a combination thereof. Particularly, the filler may be carbon black.

The carbon black filler is not specifically limited but may have a nitrogen adsorption specific surface area of, for example, 20 $m^2/g$ to 250 $m^2/g$ (measured based on $N_2SA$, JIS K 6217-2:2001). Also, the carbon black may have a dibutylphthalate oil absorption amount (DBP) of 80 cc/100 g to 200 cc/100 g. If the nitrogen adsorption specific surface area of the carbon black is greater than 250 $m^2/g$, the processability of the rubber composition may be deteriorated, and if the nitrogen adsorption specific surface area of the carbon black is less than 20 $m^2/g$, reinforcing performance by the carbon black may be insignificant. In addition, if the DBP oil absorption amount of the carbon black is greater than 200 cc/100 g, the processability of the rubber composition may be deteriorated, and if the DBP oil absorption amount of the carbon black is less than 80 cc/100 g, reinforcing performance by the carbon black may be insignificant.

In addition, the silica is not specifically limited, but may include, for example, wet silica (hydrated silicate), dry silica (anhydrous silicate), calcium silicate, aluminum silicate or colloid silica. Particularly, the silica may be wet silica which has the most remarkable compatibility effect of the improving effect of destruction characteristics and wet grip. In addition, the silica may have nitrogen absorption specific surface area (nitrogen surface area per gram, $N_2SA$) of 120 $m^2/g$ to 180 $m^2/g$, and cetyl trimethyl ammonium bromide (CTAB) absorption specific surface area of 100 $m^2/g$ to 200 $m^2/g$. If the nitrogen absorption specific surface area of the silica is less than 120 $m^2/g$, the reinforcing performance due to silica may be deteriorated, and if the nitrogen absorption specific surface area of the silica is greater than 180 $m^2/g$, the processability of the rubber composition may be deteriorated. In addition, if the CTAB absorption specific surface area of the silica is less than 100 $m^2/g$, the reinforcing performance by the silica filler may be deteriorated, and if the CTAB absorption specific surface area of the silica is greater than 200 m²/g, the processability of the rubber composition may be deteriorated.

Meanwhile, if the silica is used as the filler, a silane coupling agent may be used together for the improvement of reinforcing and low heating properties.

The silane coupling agent may particularly include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one among them or a mixture of two or more thereof may be used. More particularly, the silane coupling agent may be bis(3-triethoxysilylpropyl)polysulfide or 3-trimethoxysilylpropylbenzothiazyltetrasulfide in consideration of the improving effect of reinforcing properties.

In addition, the rubber composition according to an embodiment of the present invention may be sulfur cross-linkable, and so may further include a vulcanizing agent.

The vulcanizing agent may particularly be a sulfur powder and may be included in an amount of 0.1 parts by weight to 10 parts by weight with respect to 100 parts by weight of the rubber component. With the amount used in the above range, elasticity and strength required for a vulcanized rubber composition may be secured, and at the same time, a low fuel consumption ratio may be attained.

In addition, the rubber composition according to an embodiment of the present invention may further include various additives used in a common rubber industry in addition to the above-mentioned components, particularly, a vulcanization accelerator, a process oil, a plasticizer, an antiaging agent, a scorch preventing agent, a zinc white, stearic acid, a thermosetting resin, a thermoplastic resin, or the like.

The vulcanization accelerator is not specifically limited, and may particularly include a thiazole-based compound such as 2-mercaptobenzothiazole (M), dibenzothiazyldisulfide (DM), and N-cyclohexyl-2-benzothiazylsulfenamide (CZ), or a guanidine-based compound such as diphenylguanidine (DPG). The vulcanization accelerator may be included in an amount of 0.1 parts by weight to 5 parts by weight with respect to 100 parts by weight of the rubber component.

In addition, the process oil acts as a softener in a rubber composition and may particularly include a paraffin-based, naphthene-based, or aromatic compound. More particularly, an aromatic process oil may be used in consideration of tensile strength and abrasion resistance, and a naphthene-based or paraffin-based process oil may be used in consideration of hysteresis loss and properties at low temperature. The process oil may be included in an amount of 100 parts by weight or less with respect to 100 parts by weight of the rubber component. With the above-described amount range, the deterioration of the tensile strength and low exothermic properties (low fuel consumption ratio) of a vulcanized rubber may be prevented.

In addition, the antiaging agent may particularly include N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature. The antiaging agent may be used in an amount of 0.1 parts by weight to 6 parts by weight with respect to 100 parts by weight of the rubber component.

The rubber composition according to an embodiment of the present invention may be obtained by mulling using a mulling apparatus such as a banbury mixer, a roll, and an internal mixer according to a mixing prescription. In addition, a rubber composition having low heating properties and excellent abrasion resistance may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

The molded article manufactured using the rubber composition may include tires or tire treads.

Hereinafter, the present invention will be explained in particular referring to embodiments. However, the embodiments below are only for illustrating the present invention, and the scope of the present invention is not limited thereto.

PREPARATION EXAMPLES

Preparation Example 1

To a hexane solvent under nitrogen conditions, neodymium neodecanoate was added and methylaluminoxane (MAO), diisobutylaluminum hydride (DIBAH), diethylaluminum chloride (DEAC) and 1,3-butadiene were added thereto one by one so that the molar ratio of neodymium neodecanoate:MAO:DIBAH:DEAC:1,3-butadiene=1:120:43:2-3:30 was satisfied, followed by mixing at −20° C. for 12 hours to prepare a catalyst composition. The catalyst composition thus prepared was used after storing at −30° C. to −20° C. under nitrogen conditions for 24 hours.

Preparation Example 2

To a hexane solvent under nitrogen conditions, neodymium neodecanoate was added and methylaluminoxane (MAO), diisobutylaluminum hydride (DIBAH), diethylaluminum chloride (DEAC) and 1,3-butadiene were added thereto one by one so that the molar ratio of neodymium neodecanoate:MAO:DIBAH:DEAC:1,3-butadiene=1:150:48:2-3:30 was satisfied, followed by mixing at −20° C. for 12 hours to prepare a catalyst composition. The catalyst composition thus prepared was used after storing at −30° C. to −20° C. under nitrogen conditions for 24 hours.

Preparation Example 3

To a hexane solvent under nitrogen conditions, neodymium neodecanoate was added and methylaluminoxane (MAO), diisobutylaluminum hydride (DIBAH), diethylaluminum chloride (DEAC) and 1,3-butadiene were added thereto one by one so that the molar ratio of neodymium neodecanoate:MAO:DIBAH:DEAC:1,3-butadiene=1:100:40:2-3:30 was satisfied, followed by mixing at −20° C. for 12 hours to prepare a catalyst composition. The catalyst composition thus prepared was used after storing at −30° C. to −20° C. under nitrogen conditions for 24 hours.

Preparation Example 4: Preparation of ethyl 1-(trimethylsilyl)piperidine-3-carboxylate To a solution obtained by dissolving 2 g of ethyl piperidine-3-carboxylate in dichloromethane (CH$_2$Cl$_2$), 1.77 ml of triethylamine (Et$_3$N) and 1.62 ml of trimethylsilyl chloride (TMSCl) were added at 0° C., followed by stirring at 0° C. for 3 hours. Then, volatile solvents were removed under a reduced pressure, and the residue was repeatedly filtered with hexane twice. The crude product thus filtered was separated by distillation under a reduced pressure to obtain a compound having a structure below, and this compound was observed by $^1$H nuclear magnetic resonance spectroscopic spectrum.

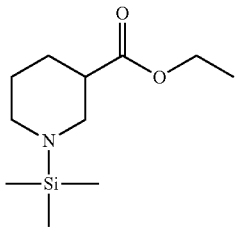

$^1$H NMR (500 MHz, CDCl$_3$) δ 4.10-4.09 (m, 2H), δ 3.19-3.17 (m, 1H), δ 2.93 (m, 1H), δ 2.79-2.72 (m, 1H), δ 2.54 (m, 1H), δ 2.24 (m, 1H), δ 1.94-1.92 (m, 1H), δ 1.63-1.58 (m, 2H), δ 1.28-1.21 (m, 4H), δ 0.00 (m, 9H).

Preparation Example 5: Preparation of ethyl 1-(trimethylsilyl)piperidine-4-carboxylate To a solution obtained by dissolving 2 g of ethyl piperidine-4-carboxylate in dichloromethane (CH$_2$Cl$_2$), 1.77 ml of triethylamine (Et$_3$N) and 1.62 ml of trimethylsilyl chloride (TMSCl) were added at 0° C., followed by stirring at 0° C. for 5 hours. Then, solvents were evaporated from the product solution under a reduced pressure, and the resultant product was re-dissolved in hexane and filtered to obtain a compound of a structure below. This compound was observed by $^1$H nuclear magnetic resonance spectroscopic spectrum.

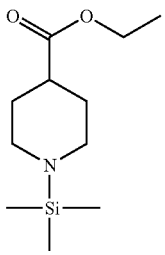

$^1$H NMR (500 MHz, CDCl$_3$) δ 4.11-4.08 (m, 2H), δ 3.13-3.11 (m, 2H), δ 2.61-2.54 (m, 2H), δ 2.34-2.32 (m, 1H), δ 1.74 (m, 2H), δ 1.42 (m, 2H), δ 1.23-1.22 (m, 3H), δ 0.05-0.00 (m, 9H).

Comparative Preparation Example 1

To a hexane solvent under nitrogen conditions, neodymium neodecanoate was added and diisobutylaluminum hydride (DIBAH), diethylaluminum chloride (DEAC) and 1,3-butadiene were added thereto one by one so that the molar ratio of neodymium neodecanoate:DIBAH:DEAC:1,3-butadiene=1:9-10:2-3:30 was satisfied, followed by mixing at 20° C. to prepare a catalyst composition. In this case, the catalyst composition was prepared just before preparing a polymer and was readily used.

Comparative Preparation Example 2

To a hexane solvent under nitrogen conditions, neodymium neodecanoate was added and methylaluminoxane (MAO), diisobutylaluminum hydride (DIBAH), diethylaluminum chloride (DEAC) and 1,3-butadiene were added thereto one by one so that the molar ratio of neodymium neodecanoate:MAO:DIBAH:DEAC:1,3-butadiene=1:50:33:2-3:30 was satisfied, followed by mixing at −20° C. for 12 hours to prepare a catalyst composition. The catalyst composition thus prepared was used after storing at −30° C. to −20° C. under nitrogen conditions for 24 hours.

Comparative Preparation Example 3

To a hexane solvent under nitrogen conditions, neodymium neodecanoate was added and methylaluminoxane (MAO), diisobutylaluminum hydride (DIBAH), diethylaluminum chloride (DEAC) and 1,3-butadiene were added thereto one by one so that the molar ratio of neodymium neodecanoate:MAO:DIBAH:DEAC:1,3-butadiene=1:120:64:2-3:30 was satisfied, followed by mixing at 20° C. for 12 hours to prepare a catalyst composition. The catalyst composition thus prepared was used after storing at 20° C. under nitrogen conditions for 24 hours.

EXAMPLES

Example 1: Preparation of Modified Conjugated Diene-Based Polymer

To a completely dried reactor, vacuum and nitrogen were alternately applied. To a 15 L reactor in vacuum, 4.2 kg of hexane and 500 g of 1,3-butadiene were injected, and the temperature was elevated to 70° C. The catalyst composition prepared in Preparation Example 1 was added thereto, and polymerization was performed for 60 minutes to prepare an active polymer including an activated aluminum part at the terminal.

To the active polymer, a hexane solution including 1.15 g of the compound prepared in Preparation Example 4 was added and reacted under the same temperature conditions in the polymerization conditions for 30 minutes. Then, a hexane solution including a polymerization quenching agent was injected to quench the reaction, and a hexane solution including an antioxidant was added to prepare a modified butadiene-based polymer.

Example 2: Preparation of Modified Conjugated Diene-Based Polymer

A modified conjugated diene-based polymer was prepared by performing the same method as in Example 1 except for using the catalyst composition of Preparation Example 2 as the catalyst composition during preparing the active polymer in Example 1.

Example 3: Preparation of Modified Conjugated Diene-Based Polymer

A modified conjugated diene-based polymer was prepared by performing the same method as in Example 1 except for using the catalyst composition of Preparation Example 3 as the catalyst composition during preparing the active polymer in Example 1.

Example 4: Preparation of Modified Conjugated Diene-Based Polymer

A modified conjugated diene-based polymer was prepared by performing the same method as in Example 1 except for using the catalyst composition of Preparation Example 3 as the catalyst composition during preparing the active polymer, and using the compound prepared in Preparation Example 5 instead of the compound prepared in Preparation Example 4, in Example 1.

Comparative Example 1

BR1208 (manufactured by LG Chem,) was used as an unmodified Nd—BR.

Comparative Example 2

CB24 (manufactured by Lanxess Co.) was used as an unmodified Nd—BR.

Comparative Example 3

A modified conjugated diene-based polymer was prepared by performing the same method as in Example 1 except for using the catalyst composition of Comparative Preparation Example 1 as the catalyst composition during preparing the active polymer in Example 1.

Comparative Example 4

A modified conjugated diene-based polymer was prepared by performing the same method as in Example 1 except for using the catalyst composition of Comparative Preparation Example 2 as the catalyst composition during preparing the active polymer in Example 1.

Comparative Example 5

A modified conjugated diene-based polymer was prepared by performing the same method as in Example 1 except for using the catalyst composition of Comparative Preparation Example 3 as the catalyst composition during preparing the active polymer in Example 1.

EXPERIMENTAL EXAMPLES

Experimental Example 1

With respect to each of the polymers prepared in the Examples and Comparative Examples, microstructure analysis, a number average molecular weight (Mn), a weight average molecular weight (Mw), molecular weight distribution (MWD), and mooney viscosity (MV) were measured, respectively.

1) Microstructure analysis

The cis bond content in each polymer was measured using Varian VNMRS 500 MHz NMR, and 1,1,2,2-tetrachloroethane D2 (DLM-35, Cambridge Isotope Co.) was used as a solvent.

2) Weight average molecular weight (Mw), number average molecular weight (Mn) and molecular weight distribution (MWD)

Each polymer was dissolved in tetrahydrofuran (THF) for 30 minutes under 40° C. conditions, and the resultant solution was loaded on gel permeation chromatography (GPC) and flown. In this case, two columns of PLgel Olexis (trade name, Polymer Laboratories Co. Ltd.) and one column of PLgel mixed-C were used in combination. Also, newly replaced columns were all mixed bed type columns, and polystyrene was used as a GPC standard material.

3) Mooney viscosity (ML1+4, @100° C.) (MU)

The mooney viscosity (ML1+4, @100° C.) (MU) was measured by using MV2000E of Monsanto Co. using Large Rotor at a rotor speed of 2±0.02 rpm conditions at 100° C. for each polymer. In this case, a specimen used was stood at room temperature (23±3° C.) for 30 minutes or more, and 27±3 g of the specimen was collected and put in a die cavity, and then, Platen was operated and the mooney viscosity was measured while applying torque.

4) Modification Ratio

The modification ratio was calculated using a chromatogram obtained by measuring chromatography.

Particularly, each polymer was dissolved in tetrahydrofuran (THF) under 40° C. conditions to prepare a specimen, and each specimen was injected into gel permeation chromatography (GPC). Tetrahydrofuran was flown as an eluent to obtain a chromatogram, and from the chromatogram thus obtained, a modification ratio was calculated according to the following Mathematical Formula 1:

[Mathematical Formula 1]

$$\text{modification ratio (\%)} = \frac{\text{peak area of modified polymer}}{\text{peak area of unmodified polymer} + \text{peak are of modified polymer}} \times 100$$

TABLE 1

| | | Example | | | | Comparative Example | | | | |
|---|---|---|---|---|---|---|---|---|---|---|
| Division | | 1 | 2 | 3 | 4 | 1 | 2 | 3 | 4 | 5 |
| Microstructure analysis | Cis-1,4 bond | 96.9 | 96.8 | 97.1 | 97.1 | 96.2 | 96.3 | 96.2 | 96.5 | 96.4 |
| | Trans-1,4 bond | 2.5 | 2.6 | 2.3 | 2.3 | 1.8 | 3.2 | 3.0 | 2.9 | 3.0 |
| | Vinyl | 0.6 | 0.6 | 0.6 | 0.6 | 2.0 | 0.5 | 0.8 | 0.6 | 0.6 |

TABLE 1-continued

|  | Division | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| GPC results | Mn (×10⁵ g/mol) | 3.33 | 3.30 | 3.36 | 3.34 | 1.57 | 2.26 | 2.63 | 2.73 | 2.71 |
|  | Mw (×10⁵ g/mol) | 7.61 | 7.52 | 7.75 | 7.70 | 7.78 | 6.06 | 7.31 | 6.90 | 7.03 |
|  | MWD (Mw/Mn) | 2.29 | 2.28 | 2.31 | 2.31 | 4.96 | 2.37 | 2.78 | 2.52 | 2.59 |
|  | Mooney viscosity | 57 | 55 | 60 | 59 | 45 | 47 | 47 | 52 | 54 |
|  | Modification ratio (mol %) | 31 | 30 | 32 | 32 | — | — | 14 | 17 | 16 |

As shown in Table 1, the polymers of Example 1 to Example 4, which were prepared in the presence of the catalyst composition according to an embodiment of the present invention, showed a high modification ratio of 30 mol % or more. On the contrary, the polymers of Comparative Example 3 to Comparative Example 5 showed a low modification ratio of 20 mol % or less. In this case, the polymers of Comparative Example 3 to Comparative Example 5 were prepared by the same method as in Example 1 except for using a catalyst composition prepared under conditions other than the conditions suggested in an embodiment of the present invention.

From the results, it was found that the modified conjugated diene-based polymer according to an embodiment of the present invention was prepared by the preparation method including polymerizing a conjugated diene-based monomer in the presence of a catalyst composition suggested by the present invention, and thus modification reaction thereof was easily performed, thereby achieving a high modification ratio.

Experimental Example 2

A rubber composition and a rubber specimen were manufactured using each of the polymers prepared in the Examples and the Comparative Examples, and tensile strength, 300% modulus, elongation and viscoelasticity properties were measured, respectively. The results are listed in Table 2 below.

Particularly, each rubber composition was prepared by compounding 100 parts by weight of each polymer with 70 parts by weight of carbon black, 22.5 parts by weight of a process oil, 2 parts by weight of an antiaging agent (TMDQ), 3 parts by weight of zinc white (ZnO), and 2 parts by weight of stearic acid. Then, to each rubber composition, 2 parts by weight of sulfur, 2 parts by weight of a vulcanizing accelerator (CZ) and 0.5 parts by weight of a vulcanization accelerator (DPG) were added and gently mixed at 50° C. for 1.5 minutes in 50 rpm. Then, by using a roll of 50° C., a vulcanized compounding product having a sheet shape was obtained. The vulcanized compounding product thus obtained was vulcanized at 160° C. for 25 minutes to manufacture a rubber specimen.

1) Tensile strength (kg·f/cm²), 300% modulus (kg·f/cm²) and elongation

After vulcanizing each rubber composition at 150° C. for t90 minutes, the tensile strength, the modulus when elongated by 300% (M-300%) and the elongation of the vulcanized product when breaking were measured according to an ASTM D412.

2) Viscoelasticity properties (Tan δ @60° C.)

Tan δ properties at 60° C., that are the major factors of a low fuel consumption properties were measured as viscoelasticity coefficient (Tan δ) at a frequency of 10 Hz, prestrain of 3%, and dynamic strain of 3% by using DMTS 500N of Gabo Co., Germany. In this case, if the Tan δ value at 60° C. decreased, hysteresis loss decreased and rotation resistance property was excellent, that is, a fuel efficiency was excellent.

TABLE 2

|  | Division |  | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|---|
| Tensile properties (index) | M-300% |  | 116 | 117 | 114 | 113 | 87 | 100 | 103 | 106 | 106 |
|  | Tensile strength |  | 110 | 112 | 109 | 109 | 94 | 100 | 102 | 104 | 103 |
|  | Elongation |  | 97 | 97 | 98 | 98 | 104 | 100 | 100 | 100 | 100 |
| Viscoelasticity properties (index) | Tan δ @60° C. |  | 130 | 129 | 131 | 128 | 86 | 100 | 106 | 111 | 110 |

Here, the index value of the tensile properties was calculated by Mathematical Formula 2 below, with the value of Comparative Example 2 as 100, and the index value of the viscoelasticity properties was calculated by Mathematical Formula 3 below, with the value of Comparative Example 2 as 100.

Index=(measured value/reference value)×100      [Mathematical Equation 2]

Index=(reference value/measured value)×100      [Mathematical Equation 3]

As shown in Table 2, it was found that the specimens manufactured from the rubber compositions including the polymers of Example 1 to Example 4 according to embodiments of the present invention showed markedly improved tensile properties and viscoelasticity properties when compared with the specimens manufactured from the rubber compositions including the polymers of Comparative Example 1 to Comparative Example 5.

Particularly, the tensile properties and the viscoelasticity properties of Example 1 to Example 4 were markedly improved when compared with Comparative Example 3 and Comparative Example 5, which were prepared under the same conditions except for using different catalyst compositions. The results show that the modified conjugated diene-based polymer according to an embodiment of the present invention has a higher modification ratio and increased affinity with a filler when compared with a polymer having a relatively lower modification ratio.

The invention claimed is:

1. A modified conjugated diene-based polymer comprising a functional group derived from a compound represented by the following Formula 1,
wherein a modification ratio of the modified conjugated diene-based polymer is from 20 mol % to 50 mol %:

[Formula 1]

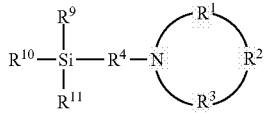

in Formula 1,
$R^1$ and $R^3$ are each independently selected from a bond, or a hydrocarbon group of 1 to 10 carbon atoms, which is optionally substituted with a substituent selected from the group consisting of a halogen group, an alkyl group of 1 to 20 carbon atoms, a cycloalkyl group of 3 to 20 carbon atoms and an aryl group of 6 to 30 carbon atoms, provided that at least one of $R^1$ or $R^3$ is not a bond,
$R^2$ is a trivalent hydrocarbon group of 1 to 10 carbon atoms, which is substituted with —$R^6COOR^7$,
$R^4$ and $R^6$ are single bonds,
$R^7$ is an alkyl group of 1 to 20 carbon atoms, or a cycloalkyl group of 3 to 20 carbon atoms, and
$R^9$ to $R^{11}$ are each independently hydrogen or an alkyl group of 1 to 20 carbon atoms.

2. The modified conjugated diene-based polymer according to claim 1, wherein in Formula 1, $R^1$ and $R^3$ are each independently an unsubstituted alkylene group of 1 to 10 carbon atoms,
$R^2$ is a hydrocarbon group of 1 to 10 carbon atoms, which is substituted with —$R^6COOR^7$,
$R^4$ and $R^6$ are single bonds,
$R^7$ is an alkyl group of 1 to 20 carbon atoms, and
$R^9$ to $R^{11}$ are each independently an alkyl group of 1 to 20 carbon atoms.

3. The modified conjugated diene-based polymer according to claim 1, wherein the compound represented by Formula 1 is one selected from the group consisting of compounds represented by the following Formulae 1-1 to 1-3:

[Formula 1-1]

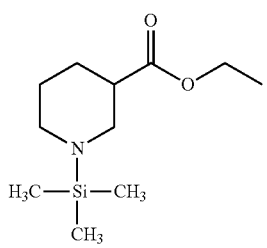

[Formula 1-2]

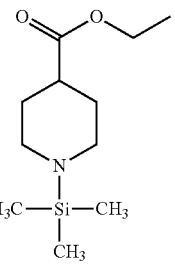

[Formula 1-3]

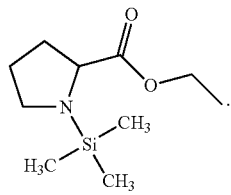

4. A method for preparing the modified conjugated diene-based polymer described in claim 1, the method comprising:
polymerizing a conjugated diene-based monomer in the presence of a lanthanide rare earth element catalyst composition to prepare an active polymer comprising an organometal part; and
reacting the active polymer with a compound represented by the following Formula 1,
wherein the lanthanide rare earth element catalyst composition comprises a lanthanide rare earth element-containing compound, a first alkylating agent, a second alkylating agent, a halide and a conjugated diene-based monomer in a molar ratio of 1:100 to 200:40 to 60:2 to 4:20 to 50:

[Formula 1]

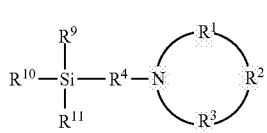

in Formula 1,
$R^1$ and $R^3$ are each independently selected from a bond, or a hydrocarbon group of 1 to 10 carbon atoms, which is optionally substituted with a substituent selected from the group consisting of a halogen group, an alkyl group of 1 to 20 carbon atoms, a cycloalkyl group of 3 to 20 carbon atoms and an aryl group of 6 to 30 carbon atoms, provided that at least one of $R^1$ or $R^3$ is not a bond,
$R^2$ is a hydrocarbon group of 1 to 10 carbon atoms, which is substituted with —$R^6COOR^7$,
$R^4$ and $R^6$ are single bonds,
$R^7$ is an alkyl group of 1 to 20 carbon atoms, or a cycloalkyl group of 3 to 20 carbon atoms, and
$R^9$ to $R^{11}$ are each independently hydrogen or an alkyl group of 1 to 20 carbon atoms.

5. The method for preparing the modified conjugated diene-based polymer according to claim 4, wherein the catalyst composition is prepared by mixing the lanthanide rare earth element-containing compound, the first alkylating agent, the second alkylating agent, the halide and the conjugated diene-based monomer at a temperature of −30° C. to −20° C. in the presence of a hydrocarbon-based solvent, and standing at a temperature of −30° C. to −20° C. for 24 hours to 36 hours.

6. The method for preparing the modified conjugated diene-based polymer according to claim 4, wherein the lanthanide rare earth element-containing compound comprises a neodymium compound represented by the following Formula 3:

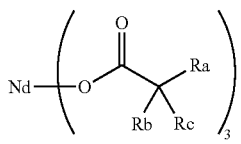

[Formula 3]

in Formula 3,
$R_a$ to $R_c$ are each independently hydrogen, or an alkyl group of 1 to 12 carbon atoms, where all $R_a$ to $R_c$ are not hydrogen at the same time.

7. The method for preparing the modified conjugated diene-based polymer according to claim 4, wherein the first alkylating agent is one or more aluminoxanes selected from the group consisting of methylaluminoxane, modified methylaluminoxane, ethylaluminoxane, n-propylaluminoxane, isopropylaluminoxane, n-butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane and 2,6-dimethylphenyl aluminoxane.

8. The method for preparing the modified conjugated diene-based polymer according to claim 4, wherein the second alkylating agent is one or more selected from the group consisting of diethylaluminum hydride, di-n-propylaluminum hydride, diisopropylaluminum hydride, di-n-butyl aluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride and benzyl-n-octylaluminum hydride.

9. The method for preparing the modified conjugated diene-based polymer according to claim 4, wherein the conjugated diene-based monomer is at least one selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene.

10. The method for preparing the modified conjugated diene-based polymer according to claim 6, wherein the neodymium compound represented by Formula 3 has weight average molecular weight (Mw) of 600 to 2000 g/mol.

11. The method for preparing the modified conjugated diene-based polymer according to claim 6, wherein the neodymium compound represented by Formula 3 has a solubility of about 4 g or more per 6 g of a non-polar solvent at room temperature (25° C.).

12. The method for preparing the modified conjugated diene-based polymer according to claim 4, wherein the lanthanide rare earth element-containing compound is included in an amount of 0.1 to 0.5 mmol per 100 g of the conjugated diene-based monomer.

13. The method for preparing the modified conjugated diene-based polymer according to claim 4, wherein the halide comprises at least one selected from the group consisting of a diatomic halogen, an interhalogen compound, a hydrogen halide, an organic halide, a nonmetal halide, a metal halide, and an organometal halide.

14. The modified conjugated diene-based polymer according to claim 1, having a molecular weight distribution (Mw/Mn) of 2.0 to 3.0.

15. The modified conjugated diene-based polymer according to claim 1, having a weight average molecular weight (Mw) of $4 \times 10^5$ to $1.0 \times 10^6$ g/mol, and a number average molecular weight (Mn) of $2.0 \times 10^5$ to $5.0 \times 10^5$ g/mol.

16. The modified conjugated diene-based polymer according to claim 1, having a mooney viscosity (MV) measured by using a mooney viscometer at a rotor speed of 2±0.02 rpm at 100° C. of 30 to 70.

17. A rubber composition comprising the modified conjugated diene-based polymer according to claim 1.

* * * * *